Dec. 5, 1961   J. N. SANDVEN ET AL   3,011,366
BLADE SHARPENING JIG
Filed Sept. 2, 1959
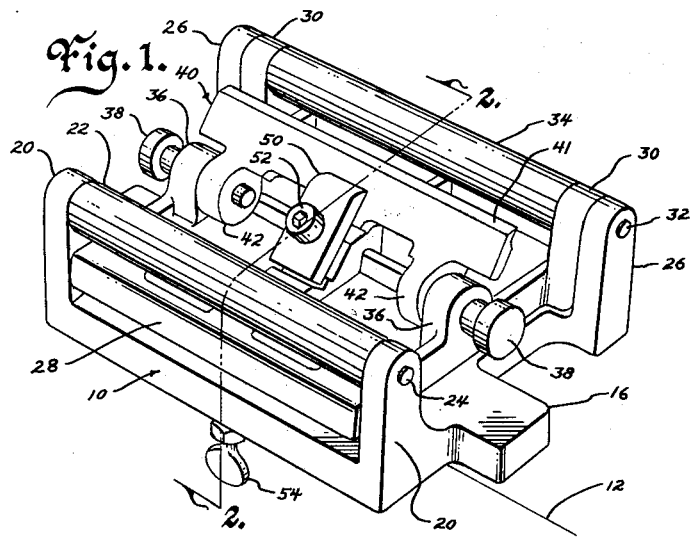
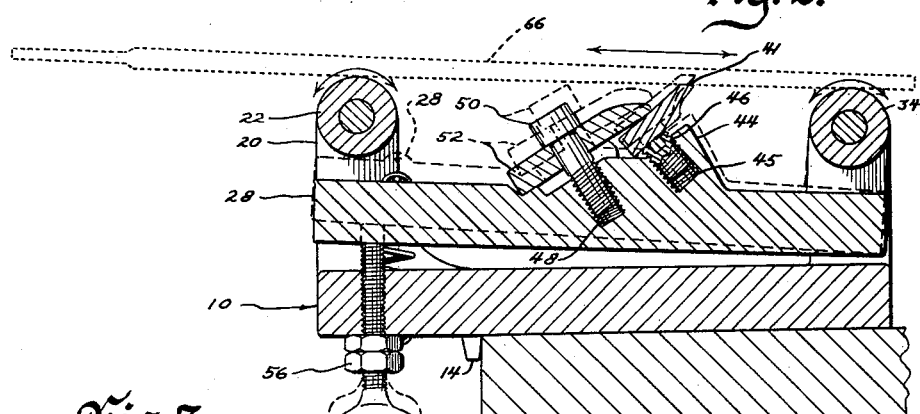
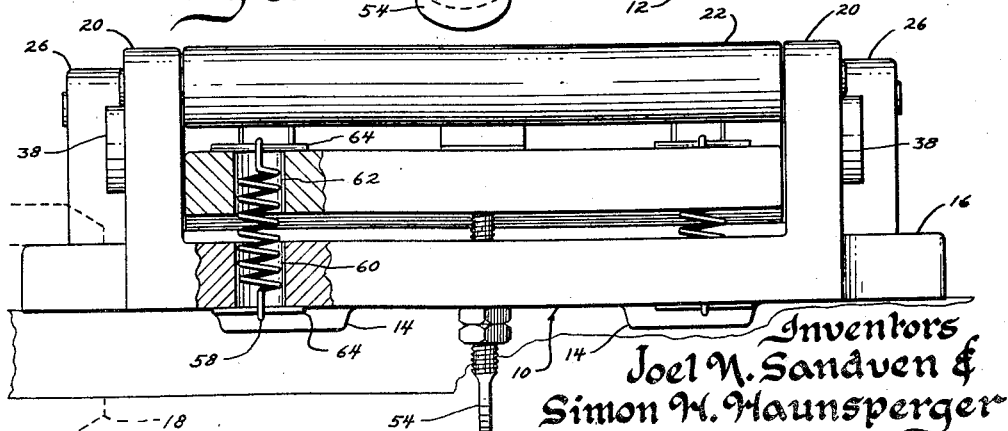
Witness
Edward P. Seeley
Inventors
Joel N. Sandven &
Simon H. Haunsperger
by Donald H. Zarley
Attorney ively. Pins
United States Patent Office
3,011,366
Patented Dec. 5, 1961

3,011,366
BLADE SHARPENING JIG
Joel N. Sandven and Simon H. Haunsperger,
Kellogg, Jasper County, Iowa
Filed Sept. 2, 1959, Ser. No. 837,704
6 Claims. (Cl. 76—82)

Our invention relates to the blade sharpening art and more specifically to a device for holding a blade during the sharpening operation.

Many blades require a highly sharpened edge for best results by sharpness is usually the only consideration. Such is the case with hoes, blades on certain types of forage harvesters, sickles, and many other cutting tools. However, some blades which are used in precision instruments must have blades which not only are sharp, but which must have a uniformly-shaped cutting edge. Such is the case in the soft icer cream industry, for example, where the ice cream mix is frozen within a drum element. The actual freezing of the mix takes place on the inner periphery surface of the drum. Blade elements have relative motion with respect to the drum and skim the frozen ice cream mix off of the drum surface. The consistency of the ice cream is greatly controlled and affected by the uniform degree of engagement between the drum and the blades. Consequently, the blades must be continuously sharpened but the sharp edge avails little if it does not also uniformly engage the drum surface. This same problem is present with many other types of blades, such as those used in the meat industry, and particularly those in the ham and bacon skinning operations.

Therefore, the principal object of our invention is to provide a blade sharpening jig that will permit the uniform sharpening of a blade element.

A further object of our invention is to provide a blade sharpening jig that will permit the accurate and uniform sharpening of a blade element with any straight elongated file member.

A still further object of our invention is to provide a blade sharpening jig that can be adjusted so as to permit a blade to be sharpened without altering the degree of bevel on the cutting edge.

A still further object of our invention is to provide a blade sharpening jig that can be adjusted to compensate for the wearing down of the cutting edge on a used blade.

A still further object of our invention is to provide a blade sharpening jig that can guide the file member without causing any substantial wear on the file member.

A still further object of our invention is to provide a blade sharpening jig that that is economical of manufacture, durable in use and refined in appearance.

These and other objects will be apparent to those skilled in the art.

Our invention consists in the construction, arrangements, and combination, of the various parts of the device, whereby the objects contemplated are attained as hereinafter more fully set forth, specifically pointed out in our claims, and illustrated in the accompanying drawings, in which:

FIG. 1 is a perspective view of our device with a blade from a soft ice cream machine inserted therein;

FIG. 2 is a sectional view of our device taken on line 2—2 of FIG. 1; and

FIG. 3 is a partial front elevational view of our device with a portion thereof cut away to more fully illustrate its construction.

We have used the numeral 10 to generally designate the horizontal base portion of our device which can rest on a table top or work bench 12. Shoulders 14 extend downward from the bottom of base 10 to insure that the front portion of the base will extend over and beyond the table 12 when its base is resting on the table. Lugs 16 extend from either side of base 10 to provide a surface upon which conventional clamp 18 can detachably secure the base to the table 12.

As clearly shown in FIG. 1, two vertical posts 20 extend upwardly from the forward corners of base 10 and a horizontal roller 22 is rotatably mounted between posts 20 by means of pin 24. Two vertical posts 26 extend upwardly from the rearward corners of base 10. A platform 28 is suspended just above base 10 by means of posts 30 which extend vertically upwardly from its rearward corners and which in turn are pivotally secured to posts 26 by means of pins 32. As shown in FIG. 1, platform 28 dwells within the area between the two sets of posts 20 and 26 and the posts 30 are each positioned adjacent one of the posts 26 on base 10. A roller 34 is also rotatably mounted between posts 30 by means of pin 32 and roller 34 dwells in the same horizontal plane as roller 22.

Two upwardly extending ear portions 36 are mounted on the side of platform 28 and each has a horizontal bore which is in axial alignment with the other. Stud pins 38 are adapted to detachably extend inwardly and through the bores of ear portions 36. A conventional soft ice cream machine blade 40 with a beveled cutting edge 41 has ear portions 42 extending therefrom which are so spaced that the bores therein can register with the bores in ear portions 36 so that stud pins 38 can effect the pivoted connection between blade 40 and platform 28.

A beveled shoulder 44 extends upwardly from platform 28 in between ear portions 36. An angular threaded bore 45 extends downwardly and rearwardly into shoulder 44, as shown in FIG. 2, and screw 46 is threadably mounted therein and is permitted to project therefrom at times to engage the lower surface of blade 40. Screw 46 thereupon serves to hold blade 40 in an inclined position when the blade is resting thereagainst. A second angular threaded bore 48 extends downwardly and rearwardly into shoulder 44 and screw 50 is threadably received therein. Bore 48 is located forwardly of bore 45. Screw 50 passes through clasp member 52 which in turn engages the upper surface of blade 40 when blade 40 is resting on screw 46.

A wing screw 54 extends vertically upward through a threaded hole in base 10 at a point near the forward edge of the base. Screw 54 is adapted to engage the lower surface of platform 28 at times and nuts 56 on screw 54 can be used to limit its movement through the base. Springs 58 extend through registering bores 60 and 62 in base 10 and platform 28, respectively. Pins 64 extend through the ends of springs 58 and engage the upper surface of platform 28 and the lower surface of base 10 to maintain the springs within the registering bores 60 and 62. Springs 58 are normally in compression and tend to hold base 10 and platform 28 together.

The normal operation of our device is as follows: The base 10 is placed on a table 12 in the position shown in FIG. 2 and conventional clamps 18 can be used to engage the lower surface of the table and the upper surface of lugs 16 to anchor the base 10 to the table. With pins 38 removed from ears 36, blade 40 is placed between ears 36 so that the bores in ears 36 register with the bores in the ears 42 on blade 40. Pins 38 can then be inserted into the registering bores in the ears 36 and 42 to effect the pivoted connection between the blade 40 and platform 28. The connection of blade 40 to platform 28 is accomplished while screw 50 is in a loosened condition so as to permit the insertion of blade 40 between clasp member 52 and screw 46. A steel file 66 can then be placed across rollers 22 and 34 in an effort to see if the beveled cutting edge 41 of blade 40 engages the file. If the edge 41 of blade 40 is below the cutting surface of file 66, screw 54 can be screwed upwardly through base 10 to pivot platform 28 and blade 40 in an upward direction. Obviously, this action could be reversed if blade 40 were too high.

If the plane of the beveled cutting edge 41 does not dwell in the same horizontal plane as the tops of the two rollers 22 and 34 and the bottom of file 66, clasp 52 can be removed from shoulder 44; blade 40 can be pivoted in a forwardly direction about pins 38; and screw 46 can be screwed inwardly or outwardly, as the case may require, to alter the means of support for blade 40 and hence, alter its angular position with respect to platform 28 when the lower surface of the blade engages the top of screw 46.

When the beveled cutting edge 41 of blade 40 is positioned in the "cutting plane" of file 66, screw 50 can tighten clasp 52 against the blade to hold it in a fixed position. The operator can then move the file back and forth on rollers 22 and 34 and rest assured that these rollers will maintain the file in a fixed plane with respect to the blade so that a uniform cutting edge will result from the sharpening operation.

Thus, from the foregoing, it is seen that our device will accomplish at least all of its stated objectives and the principle thereof can be used to sharpen blades of many different precision machines.

Some changes may be made in the construction and arrangement of our blade sharpening jig without departing from the real spirit and purpose of our invention, and it is our intention to cover by our claims, any modified forms of structure or use of mechanical equivalents which may be reasonably included within their scope.

We claim:

1. In a blade sharpening jig, a horizontal base, pairs of posts extending upwardly from said base, a pair of spaced apart horizontal and parallel elongated rollers extending between pairs of said posts, a blade holding means pivotally secured to said base between said rollers, means on said base for adjusting the pivotal position of said blade holding means with respect to said base, means on said base for yieldably resisting the pivotal adjustment of said blade holding means at times, and a movable blade positioning means secured to said blade holding means for adjusting the position of an elongated blade held thereon.

2. In a blade sharpening jig, a horizontal base, pairs of posts extending upwardly from said base, a pair of spaced apart horizontal and parallel elongated rollers extending between pairs of said posts, a blade holding means pivotally secured to said base between said rollers, means on said base for yieldably resisting the pivotal movement of said blade holding means at times, and means secured to said blade holding means for pivotally supporting a blade member on said blade holding means.

3. In a blade sharpening jig, a horizontal base, pairs of posts extending upwardly from said base, a pair of spaced apart horizontal and parallel elongated rollers extending between pairs of said posts, a blade holding means pivotally secured to said base between said rollers, means secured to said base for adjusting the pivotal position of said blade holding means with respect to said base, means on said base for yieldably resisting the pivotal adjustment of said blade holding means at times, and means secured to said blade holding means for pivotally supporting a blade member on said blade holding means.

4. In a blade sharpening jig, a horizontal base, pairs of posts extending upwardly from said base, a pair of spaced apart horizontal and parallel elongated rollers extending between pairs of said posts, a platform pivotally mounted to one pair of said posts and having a common pivotal axis with one of said rollers, means on said base for adjusting the position of said platform with respect to said base, a blade holding element on said platform, and a movable blade positioning means on said blade holding element for adjusting the position of an elongated blade held thereon.

5. In a blade sharpening jig, a horizontal base, pairs of posts extending upwardly from said base, a pair of spaced apart horizontal and parallel elongated rollers extending between pairs of said posts, a platform pivotally mounted to one pair of said posts and having a common pivotal axis with one of said rollers, means on said base for adjusting the position of said platform with respect to said base, a blade holding element on said platform, means on said blade holding element for pivotally supporting a blade member on said blade holding element, and a movable blade positioning means on said blade holding element for adjusting the position of an elongated blade held thereon.

6. The structure of claim 5 wherein the means on said blade holding element for pivotally supporting a blade member is comprised of a pair of ear elements on said blade holding means having axially aligned bores therein, and pins detachably mounted in and extending from said bores; said pins being adapted to pivotally support a blade having apertured ears journaled on said pins.

References Cited in the file of this patent

UNITED STATES PATENTS

| | | |
|---|---|---|
| 6,858 | Woodruff | Nov. 6, 1849 |
| 98,447 | Tyson | Dec. 28, 1869 |
| 272,345 | Stephens | Feb. 13, 1883 |
| 868,151 | Arnold | Oct. 15, 1907 |
| 946,635 | Franke | Jan. 18, 1910 |
| 976,927 | Rundel | Nov. 29, 1910 |
| 1,042,253 | Nilsson | Oct. 22, 1912 |
| 1,480,564 | Morrison | Jan. 15, 1924 |
| 2,557,093 | Garbarino | June 19, 1951 |
| 2,644,279 | Stankovich | July 7, 1953 |
| 2,707,409 | Fitch | May 3, 1955 |